June 3, 1969 F. H. POETTMANN 3,447,507
APPARATUS FOR LUBRICATING FLUID FLOW IN PIPELINES
Original Filed Oct. 12, 1964 Sheet 1 of 2

INVENTOR
FRED H. POETTMANN

June 3, 1969

F. H. POETTMANN 3,447,507

APPARATUS FOR LUBRICATING FLUID FLOW IN PIPELINES

Original Filed Oct. 12, 1964

INVENTOR
FRED H. POETTMANN

United States Patent Office 3,447,507
Patented June 3, 1969

3,447,507
APPARATUS FOR LUBRICATING FLUID
FLOW IN PIPELINES
Fred H. Poettmann, Littleton, Colo., assignor to Marathon Oil Company, Findlay, Ohio, a corporation of Ohio
Application Oct. 12, 1964, Ser. No. 405,885, now Patent No. 3,216,435, dated Nov. 9, 1965, which is a continuation-in-part of Ser. No. 253,576, Jan. 24, 1963. Divided and this application Mar. 19, 1965, Ser. No. 449,912
Int. Cl. B05c 11/02, 3/02
U.S. Cl. 118—72                                 3 Claims

ABSTRACT OF THE DISCLOSURE

Pipeline pigs being propelled through a pipeline by the pressure of the liquid flowing within the pipeline can expel a relatively low viscosity liquid layer between a relatively high voscosity liquid flowing in the pipeline and the internal surface of the pipeline.

---

Figure 1:
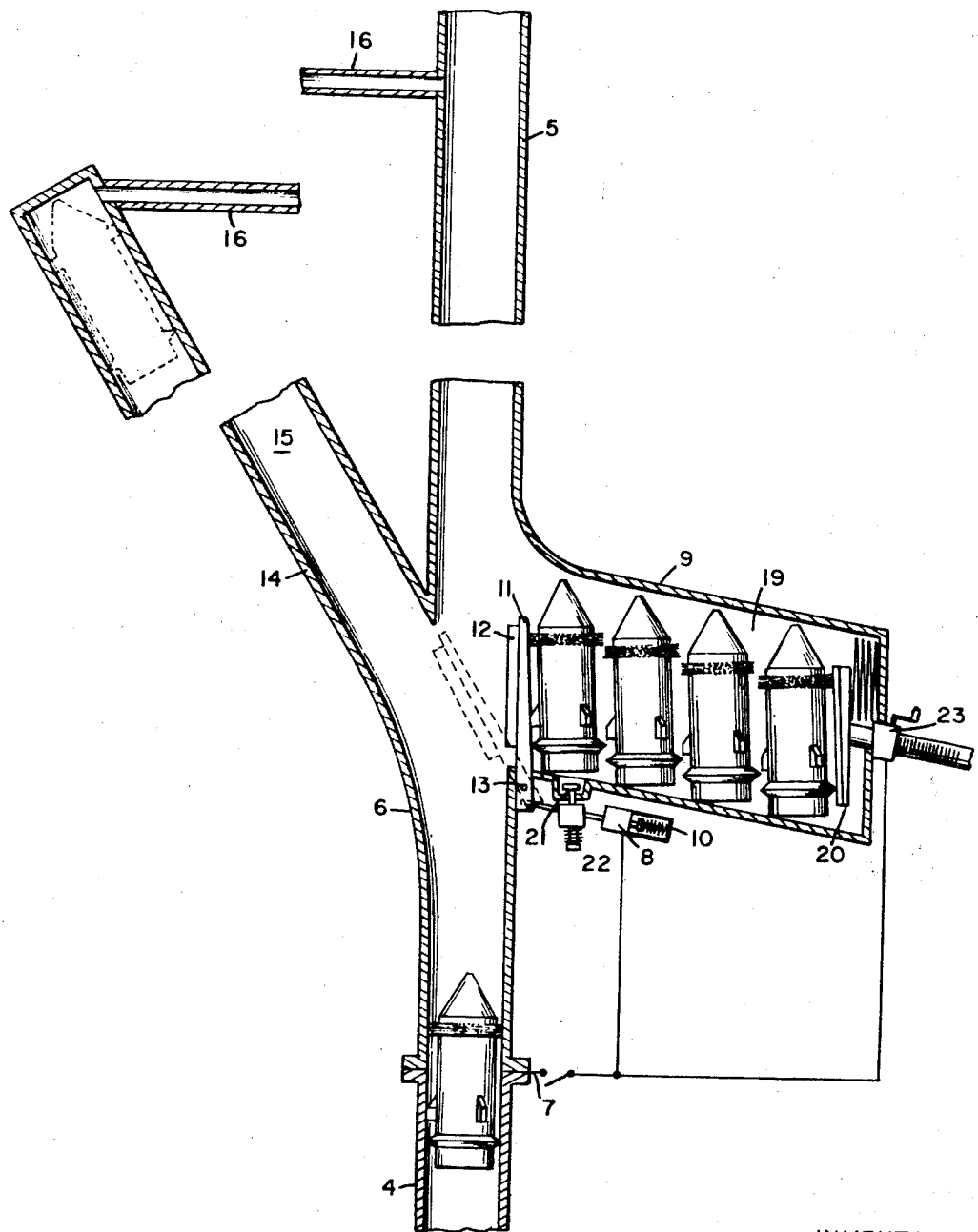

This application is a division of my copending United States patent aplication, Ser. No. 405,885 filed October 12, 1964, now United States Patent 3,216,435, which application was in turn a continuation-in-part of my United States application Ser. No. 253,576 filed January 24, 1963, now abandoned.

This invention relates to a method and means of maintaining a film of a low viscosity liquid on the interior surface of a pipe line transporting a viscous liquid.

The use of a water film for concentric flow with oil in a pipe line is a well known procedure and various mechanical arrangements have been provided for such water introduction into a pipe line. Usually such films have a progressively reducing efficiency from the point of introduction, particularly when the interior surfaces of the line are rough or corroded creating turbulence in the flow. Once the concentric flow pattern is lost because of such turbulence or other causes, the water does not reform in concentric pattern and it then becomes excess material in transport reducing the flow capacity of the line.

In order to provide anything approaching a continuous concentric flow pattern in the prior art practices, it has been necessary to provide input stations at predetermined intervals along the line so as to establish a new down stream concentric flow pattern after a predetermined period of operation with an upstream concentric flow. As the factors influencing flow may vary considerably in a given length of line, one such introduction point may be located properly while the next one is not, and the concentric flow pattern therefore is not continuous and the intended effect is not maintained throughout the continuous flow.

My invention provides several innovations in utilizing concentric flow of liquids in pipe lines. The practice of the invention consists in periodically injecting a novel type of pig into a pipe line transporting a relatively viscous liquid. This pig contains a charge of lower viscosity liquid or solution which is discharged at a controlled rate and in controlled volume preferably in conjunction with an advance scouring or cleansing of the interior surface of the pipe so as to provide better adherence of the deposited film to the pipe surface. The pigs so introduced are removed from the line after a predetermined course of travel and a new one is introduced to travel through and adjoining downstream portion of the line so as to maintain continuous filming throughout the extent of the line.

This means of applying the film of lower viscosity liquid to the inner surface of the pipe line provides a uniform distribution and as a result the film may be relatively thin as the duration of such a concentric pattern can be accurately determined and the interval between pig introductions can be regulated to provide a continuous concentric pattern. Also, in removing pigs from the line at the end of the established course of travel, the lower viscosity liquid may be separated from the viscous fluid, if desired, before the latter begins its movement along the adjoining downstream portion of the line.

The practice of my invention will be described with reference to the accompanying drawings illustrating a typical operating installation in more or less schematic form and illustrating types of pigging devices well suited for use in such an installation. In the drawings, in the several views of which like parts bear similar reference numerals.

Figure 2:
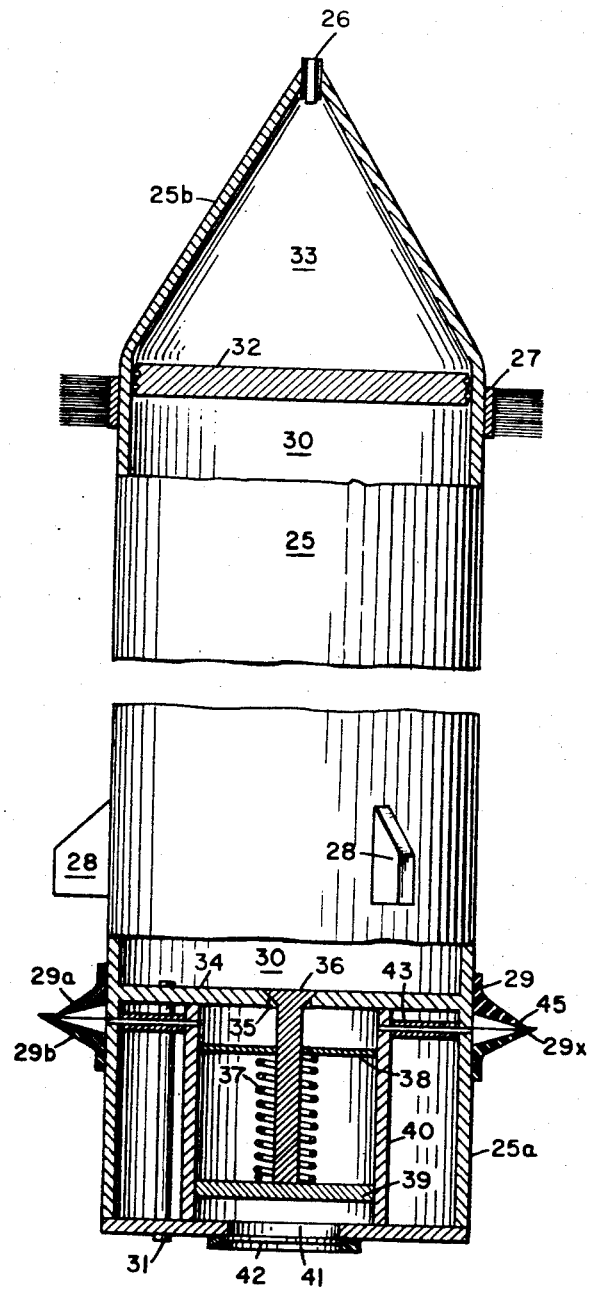

FIG. 1 is a flow sheet type of plan view of a portion of a pipe line transporting viscous oil and showing a pig injection system and stage and a pig recovery system or stage in relation to upstream and downstream portions of a pipe line;

FIG. 2 is a front elevation, partially in section, of one embodiment of a pigging device utilizing features of my invention; and Referring first to FIG. 1, the pipe line shown comprises an upstream portion 4, a downstream portion 5, and an intermediate transfer section or assembly 6. A signalling device such as a microswitch 7 is located at a suitable distance upstream, such as in the joint between the upstream portion 4 and intermediate portion 6, to detect passage of a pig and initiate operation of a solenoid 8 and a pig injection system 9 forming a part of the transfer assembly. Solenoid 8 acts against the resistance of a spring 10 to rotate an arm 11 and associated flanged portion 12 about a pivot 13 so as to position the flange 12 for diversion of the incoming pig into a recovery system 14 also forming a part of transfer assembly 6.

Recovery system 14 includes an elongated tubular passage 15 ranging outwardly from the normal flow path of the pipe line and closed at its end, preferably by a suitable valve (not shown) permitting intermittent pig removal as required without wasting transport fluid. Fluid reaching the closed end of passage 15 enters a return branch 16 for discharge into the downstream portion 5 of the pipe line.

The injection system 9 includes an elongated pig storage chamber 19 and a spring urged plunger 20 at its rear is actuated simultaneously with the solenoid operation to move the forward pig in the chamber against arm 11 as it rotates about pivot 13 and thus directs the pig into the fluid flow approaching downstream portion 5 at the same time an arming pin 21 is driven against the resistance of a spring 22 to puncture a diaphragm in the rear of the pig being introduced into the line. A timing device (not shown) determines the operating period of solenoid 8 before return of arm 11 to its inactive position, but the maximum time for return is less than required to move a second pig into the line. The injection system then remains inactive until switch 7 signals entry of another pig. A screw assembly 23 permits retraction of plunger 20 when pigs are put into chamber 19.

The pigs shown in storage chamber 19 may be of the type shown in FIG. 2. The hollow pig 25 shown in FIG. 2 comprises a cylindrical rearward body portion 25a and a frusto-conical forward portion 25b having a valve controlled inlet passage 26. An annular brush like scouring member 27 is mounted at the front of cylindrical portion 25a, a plurality of spacer members 28 are mounted in circumferentially spaced arrangement on an intermediate portion and an annular liquid discharge member 29 is mounted near the rear of portion 25a and is formed of flexible material such as rubber.

The cylindrical portion 25a is of substantially less diameter than the inside diameter of the line in which it is introduced while the scouring member 27 is slightly larger diameter and flexible member 29 is slightly larger. The spacers 28 provide a slight clearance and are essentially rigid so as to prevent and appreciable tilting of the pig in its movement through the line.

The interior of cylindrical portion 25a is partitioned to define a fluid storage compartment 30, which is filled with detergent solution introduced through a valved inlet 31 and as compartment 30 fills it forces a piston 32 forward until its movement is arrested by the tapering surfaces of portion 25b and seals forward compartment 33 into which compressed air is charged through the valved inlet 26.

A partition 34 forming the rear enclosure or bulkhead of chamber 30 has a tapered opening 35 acting as the seat for the conical head of a valve member 36. A coil spring 37 on the stem of valve 36 is held between a fixed partition 38 and a piston or traveling head 39 secured at the end of the stem of valve 36 so as to pro-provide limited movement of the piston within a cylindrical housing 40 under the force of following fluid in the line. An opening 41 through the rear end of body 25 is normally sealed by a diaphragm 42 and admits a flow of fluid into contact with piston 39 when it is punctured by pin 21 (FIG. 1).

The drag of pig 25 in the pipeline flow causes a high pressure area upstream of the pig. This pressure is directed against piston 39 advancing it to unseat valve 36, and as a result the detergent in compartment 30 is forced by the expanding gas charge in compartment 33 to enter the restricted passages 43 and flow to the hollow interior of the flexible member 29 and discharge at a rate determined by the restriction of its outlet passage 45. Member 29 is comprised of two sections 29a and 29b and the latter has a tip portion 29x which extends beyond the periphery of section 29a so as to have wiping engagement with the interior surface of the line. Such engagement spreads the ends of members 29a and 29b to establish the restriction of passage 45 and tip 29x also wipes the liquid film discharge onto the pipe surface so as to keep it at a desired degree of thinness and provide uniform distribution and good adherence.

When the pipe line transmitting a viscous liquid such as oil utilizes an injection and recovery system of the type illustrated in FIG. 1 with pigging devices of the type shown in FIG. 2, a first injection system such as injection stage 9 is placed in the line at its upstream intake end, and a pig 25 is introduced into the oil flow at the beginning of a period of operation. Rotation of arm 11 about pin 13 in conjunction with operation of plunger 20 to move a first pig 25 into the direct flow path between portions 4 and 5 is accompanied by a simultaneous movement of pin 21 against the resistance of its associated spring 22. This action results in a puncturing of diaphragm 42 (FIG. 2) and as pig 25 is entrained in the pipe line flow it tends to drag while the following oil flows at a higher pressure and exerts a thrust on piston 39.

The resulting movement of piston 39 overcomes the resistance of spring 37 and forces valve 36 off seat 35, permitting outflow of a lower viscosity liquid such as an aqueous detergent solution from chamber 30 by expansion of gas in compartment 33 directed against piston 32 and the solution so released escapes through the passages 43 into the interior of flexible member 29 from which it discharges in controlled volume. The water film thus applied to the inner surface of the pipe is wiped by tip portion 29x so as to be spread uniformly and adhere firmly to the surface of the pipe. This action establishes the concentric flow pattern and the forward scouring member 27 cleans the pipe surfaces before water application and improves water adherence to the cleaned surfaces.

As it is possible to calculate quite accurately the duration of a concentric flow pattern with the surfactant applied in the manner just described, the volume of solution carried in a pig and its rate of outflow are controlled, as is the thickness of the applied film, so as to continuously maintain the film on the surface of the pipe through a prescribed length of line. The spacing of the pig injection and recovery systems along a pipe line is limited to insure effective operation throughout each length of line. For example, in a 12-inch line utilizing a pig holding about 10 cubic feet of liquid, the spacing interval may be about 3.6 miles, and the thickness of the film applied will be 0.001 inch. For a film 0.002 inch thick, the spacing interval would be reduced to 1.8 miles in a 12 inch line.

From the foregoing, it will be apparent that the timing interval for pig injection and removal provides for maintaining a continuous film on the pipe surface in each treatment area and as one concentric flow is terminated a new one is initiated and the benefits of concentric flow are derived throughout the total course of travel of the pigs in a line. The structural embodiments of the pigs illustrated herein are intended as typical units and the assemblies may be varied substantially as long as essential features are provided.

It will be understood that the pigging devices utilized in the practice of this invention may be fabricated from any suitable materials, preferably metallic alloys, plastics or combinations of same. As the discharge control is an important feature in the operation of the devices, the components utilized in driving the piston which expels the solution should be machined with precision. The exterior structure of such devices also may be of any suitable composition and preferably the guide members will be of a hard wear-resistant composition. The scouring members will have a longer opearting life if some degree of flexibility is provided and I prefer to use the wire brush material embedded in a metallic base portion. The essential feature of the discharge member is precision fitting coupled with flexibility so that the discharge passage is uniform throughout its circumferential extent for any predetermined discharge volume and the tip portion should have sufficient flexibility to provide the desired wiping effect.

It will also be understood that although the present invention has been illustrated in the above specific embodiments by the use of water as the lower viscosity fluid in conjunction with oil as the high viscosity major fluid being transported, the invention is by no means limited to this combination of fluids. Because of the relatively small amount of the low viscosity annular liquid required for the practice of the present invention even relatively expensive low viscosity fluids may be advantageously employed. Thus, while water is preferred for its availability, various hydrocarbons such as pentane, hexane, heptane, and others, alcohols, especially those having from 1 to about 20 carbon atoms, and aromatics such as benzene, naphthalene, zylene, toluene, etc., are among the many low viscosity fluids which may be employed. Likewise, the invention may be applied to a wide variety of transported fluids including, among others, oils and various petroleum derivatives, viscous aqueous solutions, gels, and slurries. In general, the lower viscosity liquid should preferably be immiscible with the viscous liquid so as to permit the liquids to be separated readily by decantation. Certain combinations of lower viscosity fluid with particular transport fluids will be preferred because of their ability to more effectively form a continuous film extending down the pipe line but such optimum combinations can readily be determined by persons having skill in the general art of fluid transport and the present invention includes all such combinations.

What is claimed is:
1. Device for depositing a relatively low viscosity liquid layer concentrically between a relatively high viscosity liquid flowing in the pipe line and the internal surface of the pipe line comprising
   (a) a pipe line pig, adapted to be propelled through a pipe line only by the pressure of liquid flowing within the pipe line against the upstream end of the pig, having a hollow body, of a lesser external cross section than the internal diameter of the pipe line in which the pig is to be inserted, adapted to contain a relatively low viscosity liquid lubricant;
   (b) ejector means for expelling lower viscosity liquid from the body of said pig;
   (c) annular coating means extending from the body of said pig to the internal surface of said pipe line and adapted to deposit a thin layer of lower viscosity liquid ejected from the body of said pig onto the internal surface of the pipe line;
   (d) said ejector means for expelling the lower viscosity liquid comprising a piston mounted interiorly of the body for expelling contained liquid through the ejector means;
   (e) valve means for controlling the flow of said lower viscosity liquid from said hollow body to said annular coating means, said valve means being biased to the closed position;
   (f) means for opening said valve means in response to pressure exerted by the transport fluid.

2. The device of claim 1 wherein a scouring member is provided on the exterior of the body.

3. A pigging device as defined in claim 1 in which the ejector means for expelling the lower viscosity liquid includes a charge of compressed gas which exerts an expulsive pressure on the body of confined lower viscosity liquid.

References Cited

UNITED STATES PATENTS

| 1,787,126 | 12/1930 | Steinnes. | |
| 2,894,539 | 7/1959 | Cook et al. | |
| 3,037,228 | 6/1962 | Cummings | 118—72 X |
| 3,106,735 | 10/1963 | Landrum et al. | |
| 3,108,024 | 10/1963 | Battle. | |

WALTER A. SCHEEL, *Primary Examiner.*

JOHN P. McINTOSH, *Assistant Examiner.*

U.S. Cl. X.R.

15—104.06; 118—408